March 30, 1937.  L. G. COPEMAN  2,075,178
DISPENSING DEVICE FOR SHEET RUBBER DEPOSITED FROM AN AQUEOUS DISPERSION
OF RUBBER AND THE PROCESS OF FORMING AND USING SAME
Filed Dec. 3, 1934   3 Sheets-Sheet 1

INVENTOR.
LLOYD G. COPEMAN
BY
ATTORNEYS

March 30, 1937. L. G. COPEMAN 2,075,178
DISPENSING DEVICE FOR SHEET RUBBER DEPOSITED FROM AN AQUEOUS DISPERSION
OF RUBBER AND THE PROCESS OF FORMING AND USING SAME
Filed Dec. 3, 1934 3 Sheets-Sheet 2
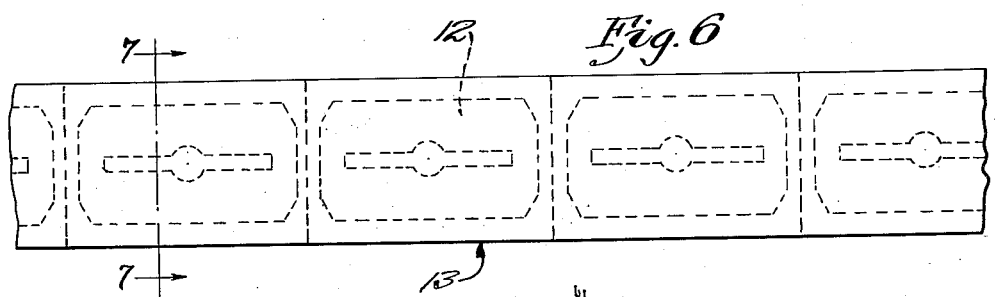
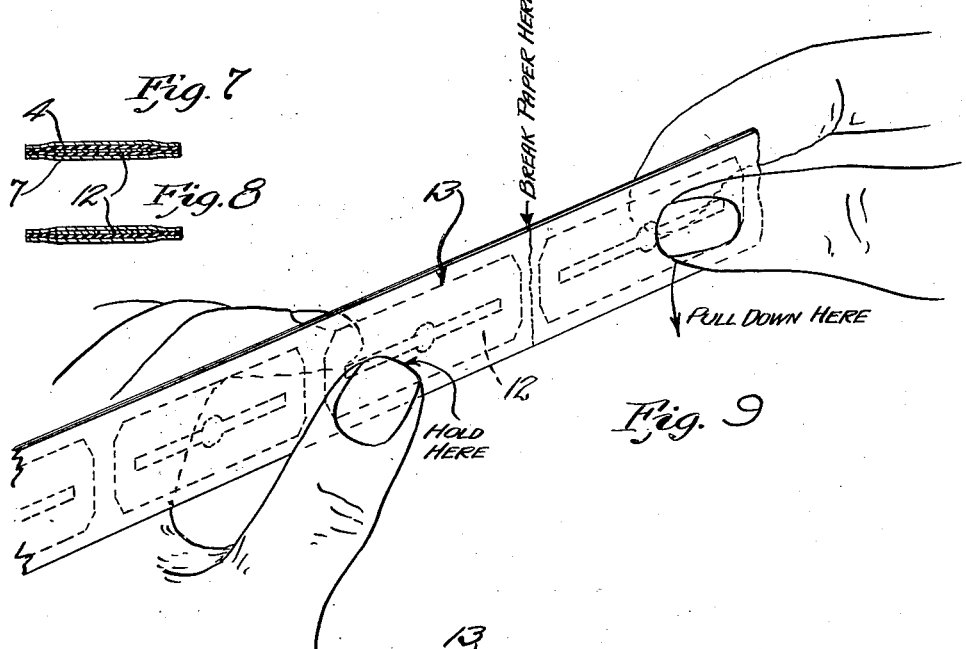
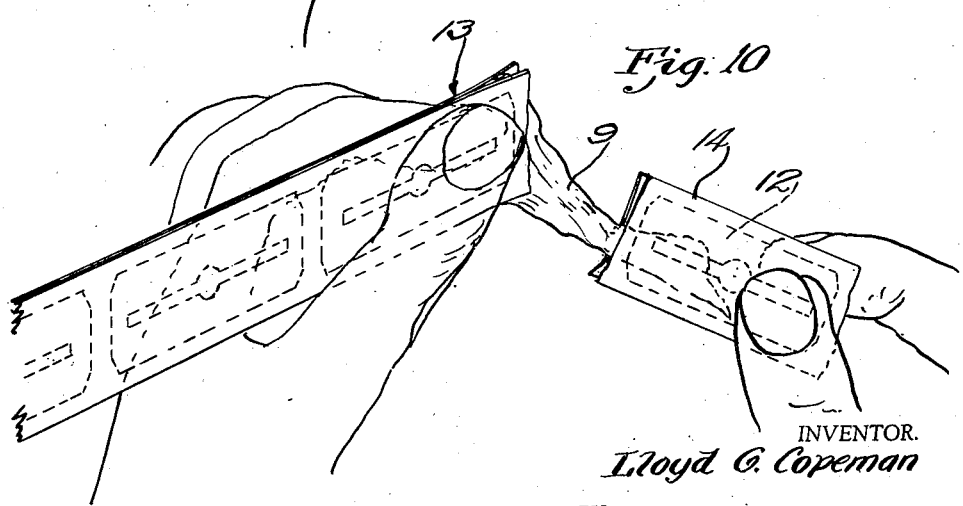
INVENTOR.
Lloyd G. Copeman
BY
ATTORNEYS.

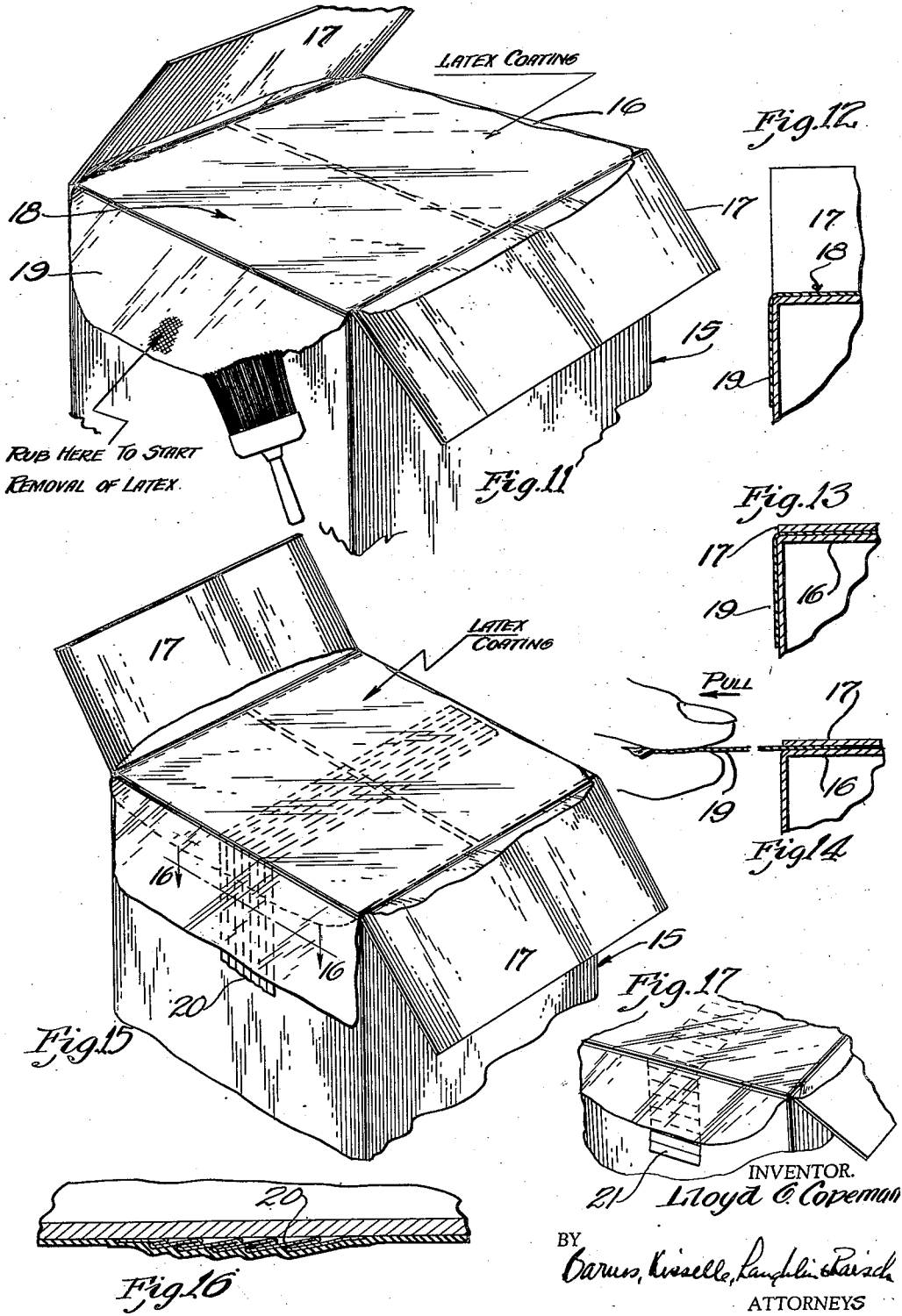

Patented Mar. 30, 1937

2,075,178

UNITED STATES PATENT OFFICE 2,075,178

DISPENSING DEVICE FOR SHEET RUBBER DEPOSITED FROM AN AQUEOUS DISPERSION OF RUBBER AND THE PROCESS OF FORMING AND USING SAME

Lloyd G. Copeman, Flint, Mich., assignor to Copeman Laboratories Company, Flint, Mich., a corporation of Michigan Application December 3, 1934, Serial No. 755,762

19 Claims. (Cl. 93—2)

REISSUED
MAY 2 1939

This invention relates to a dispensing device for sheet rubber deposited from an aqueous dispersion of rubber and the process of forming and using same, and has to do particularly with a dispensing device or what may be termed a rubber package wherein the sheet of deposited rubber is temporarily retained preparatory to many utilitarian uses.

It is an object of the present invention to form rubber sheets from aqueous dispersions of rubber in usable form. Use is made of the principle that an aqueous dispersion of rubber, such as latex, may be used to bond two sheets of paper together; but a greater use is made of the fact that the sheet of rubber, while bonding two sheets of paper together, nevertheless can be readily removed from between the two sheets; this is because the inherent toughness of the rubber is much greater than the bonding action between the sheet of rubber and the sheets of paper. The two strips of paper therefore become not only the medium of forming the rubber deposited sheet but also form a dispensing device or container from which the rubber sheet may be readily removed for various uses.

Another feature of the invention has to do with a novel method of handling uncured rubber; uncured rubber, particularly rubber deposited from an aqueous dispersion of rubber is practically impossible to handle and sticks together and is uncontrollable but, by my process, this uncured rubber is formed with the utmost ease and after once contained between the two strips of paper it can be subsequently dispensed from the paper and readily and easily used for many purposes.

Other features of the invention, including details of the process, various forms of temporarily retaining the strip of rubber in its container, and different ways of releasing the formed sheet of rubber from the container will be more clearly brought out in the specification and claims.

In the drawings:

Fig. 6 is a modified form of dispensing package wherein the retained rubber strip is adapted to seal other articles to be dispensed.

Fig. 7 is a sectional view taken on line 7—7 of Fig. 6.

Fig. 8 is a sectional view similar to Fig. 7 but illustrating a modified cross section.

Fig. 9 is a perspective view illustrating the initial step in releasing the deposited strip and one of the sealed articles, such as a razor blade.

Fig. 10 is a view similar to Fig. 9 illustrating the actual releasing step.

Fig. 11 illustrates another modified form of the invention wherein the paper backing on opposite sides of the rubber strip is formed by parts of the closure member of a paper box.

Fig. 12 is a fragmentary sectional view of the top corner of the box shown in Fig. 11.

Fig. 13 is a view similar to Fig. 12 but with the top closure member folded in position so that the strip of deposited rubber is retained between two sheets of paper.

Fig. 14 illustrates the manner of releasing the retained rubber strip so as to automatically open the box.

Fig. 15 illustrates a modification of the invention where it is used in connection with relatively heavy cardboard, a piece of plaited paper being used to assist in the release of the rubber from the cardboard surfaces of the box.

Fig. 16 is a sectional view taken on line 16—16 of Fig. 15.

Fig. 17 is a fragmentary detail view illustrating a modified manner of arranging the auxiliary plaited strip.

While I have developed many uses for my dispensing device, both in the form of a temporary package and in the use of the strip of rubber as it is being released, or after it has been released, from its dispensing package, it is believed, however, rather than show all such many uses and modifications that the few illustrated embodiments herein are sufficient to show the various and many adaptations of the process and the resulting product.

Generally speaking, the invention has to do with the preparing of a rubber deposit from an aqueous dispersion of rubber in a thin delicate membrane for practical application to any object, and the preparing and use of this membrane of rubber is through a medium of two pieces of paper; it will be understood that the paper itself has no particular function in the present application other than it serves as the temporary retaining medium for dispensing or releasing the thin rubber membrane.

Figure 1:
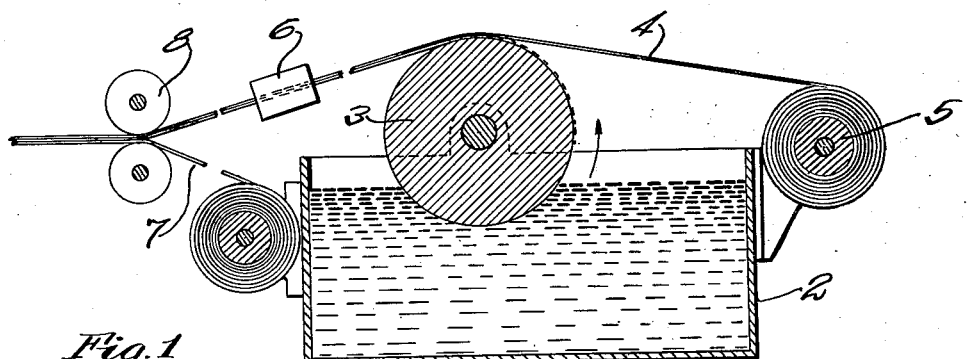
Fig. 1 is a more or less diagrammatic view illustrating one manner of forming the dispensing strips of paper.

One manner of forming the dispensing strip of paper is shown in Fig. 1 wherein the formation of the strip of paper is continuous. In this modification I have shown a tank 2 filled with an aqueous dispersion of rubber, preferably latex; a roll 3 will carry the latex in a thin film and deposit the same as a continuous coating on the under side of a continuous strip of paper 4 being fed from a roll 5. If desired, heat may be applied to the latex coating as at 6, and between the point of application of the latex to the strip of paper and the joining of another strip of paper 7 to the other side of the latex coating; this heat will assist in vaporizing and setting up the latex. Adjustable rolls 8 may be used to assure a uniform deposit and sheet of rubber. It will also be understood that the porosity of the paper will greatly assist in removing the solvent or water from the aqueous dispersion of rubber. Natural or synthetic latex may be used, in fact, substantially any form of an aqueous dispersion of rubber. The aqueous dispersion of rubber may or may not have vulcanizing ingredients embodied therein as the occasion demands; where a tacky thin membrane is required, very few vulcanizing ingredients should be embodied in the solution. Any desired concentration of latex solution or aqueous dispersion of rubber may be used, but a relatively thin solution of latex of around 30 to 40% has been found to be most practical.

In many cases it will be desirable to coat both sheets of paper with an aqueous dispersion of rubber before joining the same together; this is particularly true in connection with the modification as shown in Figs. 6 to 10, as will be later explained. Regardless of the form of the aqueous dispersion of rubber, as shown at 9 in Fig. 2, and whether it substantially sets up before assuming its final form (as when it passes through the rolls 8) or whether a large part of the absorption of water from the latex coating takes place after joining the two pieces of paper together, it will be seen that the bonding action between the deposited rubber particles and the interior surfaces of the strips of paper will form and subsequently retain the deposited strip of rubber as a uniform thin membrane 9, or a thicker member if desired for special uses.

Figure 2:
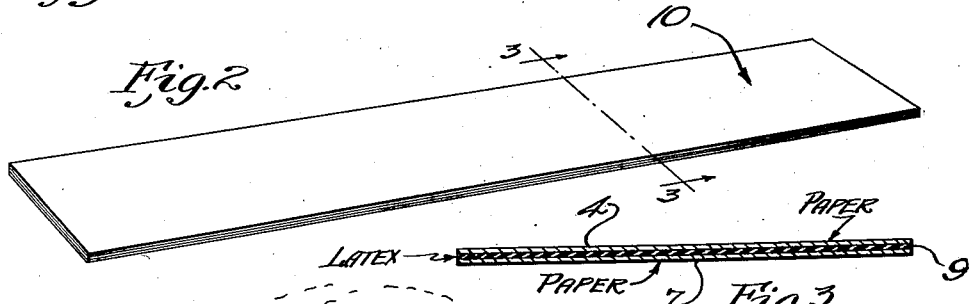
Fig. 2 is a perspective view of one form of finished product.
Figure 3:
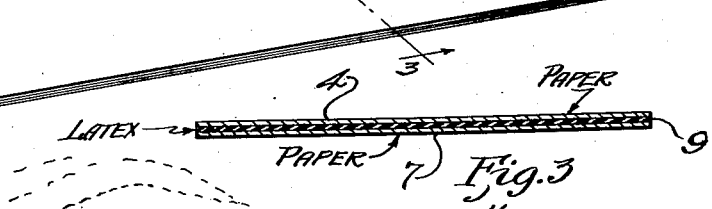
Fig. 3 is an enlarged sectional view taken on line 3—3 of Fig. 2.
Figure 4:
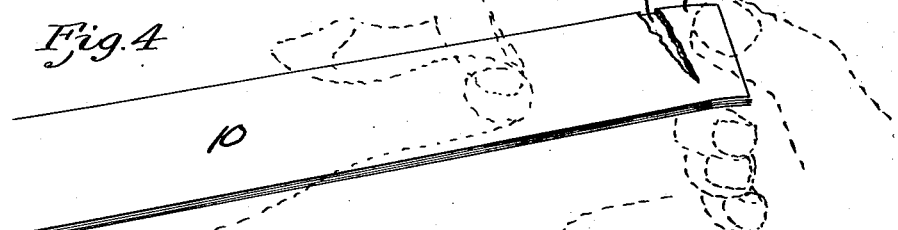
Fig. 4 illustrates the initial step of tearing away one end of the paper strip preparatory to releasing the deposited rubber sheet.
Figure 5:
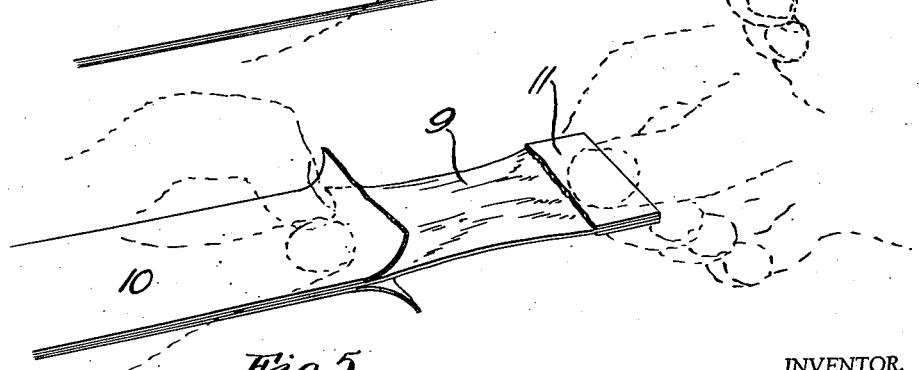
Fig. 5 illustrates the releasing step.

The formed strips of paper 10 may be cut in any length or used in rolls of various lengths, and if necessary can be kept in that form for years at a time. However, whenever it is desired to use some of the sheet rubber, all that is necessary to do is to tear away one end of the strip, as shown at 11 in Fig. 4 and subsequent positive relative movement between the torn away portion and the main portion of the strip will cause the sheet of rubber 9 to be pulled away from between the two strips of paper. While the bonding action between the rubber and the paper is sufficient to retain the shape of the strip, the tearing away action between the rubber and the sheets of paper is relatively easy. If one pulls slowly he is able to obtain a strip of rubber substantially the width of the strip of paper, or where tension is placed upon the strip of rubber it can be narrowed down considerably. For instance, if it is desired to use the thin membrane of rubber as a finger cot, the initial portion of the rubber, first pulled out as shown in Fig. 5, is placed around the finger, the short piece of paper pulled off and then the remaining piece of paper pulled away and the resulting dispensed rubber wrapped around the finger or, if the rubber sheet is to be used as a tourniquet, much more tension will be placed upon the strip of rubber as it is dispensed and as the strip of rubber is stretched and wrapped around the arm or other part of the person, the overlapped portions of rubber will stick to each other forming a very compact and secure tourniquet or bandage. It will thus be seen that this packing or dispensing device as shown in Figs. 2 and 4, may be used for many purposes, among the most important of which would be temporary repairs for many broken articles such as a fishing pole, hammer, axe or similar instrument. The binding action and strength of several layers of rubber wrapped around each other is quite amazing.

Another important use of my retaining and dispensing strip has to do with the combining and sealing of many forms of articles, such as razor blades. In the preferred form, the razor blades 12 are wrapped or enclosed in wax paper and the enclosed blades successively placed between the continuously moving strips of paper 4 and 7, and just before said two strips of paper are bonded together. Thus, the aqueous dispersion of rubber will not only bond the two sheets of rubber together but will surround and form a seal for the razor blades.

In Fig. 7 a razor blade is shown surrounded on both sides by a sheet of rubber, while in Fig. 8 it is shown as covering only one side; in either case there is complete sealing action entirely around the edge of the razor blade. To release the sheet of rubber and dispense the razor blades, it is only necessary to break the dispenser unit 13 in two, as indicated in Fig. 9, and as shown by Fig. 10, by pulling away the broken portion 14 the rubber will be quickly released from the surfaces of the paper; that is, the inner surfaces of the outer strips of paper and the outer surfaces of the paper surrounding the razor blade. Thus, in this case we have complete hermetic sealing of the razor blades plus a quick method of dispensing; also in this case the rubber performs its utilitarian function in two ways, first, while being retained as a flat sheet or sheets between the strips of paper and, second, in the manner of releasing and exposing the razor blade.

In Figs. 11 to 16 I have shown a further modification of the invention. Most cardboard boxes, such as shown at 15 are provided with two sets of closure members, that is, the inner flaps 16 and the outer flaps 17. By first folding the inner flaps in place it is possible to seal and hold these flaps in position by spraying or brushing a layer of latex or other aqueous dispersion of rubber, as shown at 18, Fig. 11. A portion of this coating of latex is extended down over one side wall of the box as at 19. While the latex is still plastic, the top flaps 17 may be folded down into normal position, as best shown in Fig. 13. The direct result of this is that a thin membrane of deposited rubber will be formed between the respective flaps 16 and 17, and said respective flaps will be bonded to this sheet of rubber. The flaps of the carton will thus be securely held in place and the contents of the carton will be sealed from the atmosphere. Now, to open the carton, it is unnecessary to tear away the flap members or use any special means for opening the same, but it is only necessary to slightly rub the edge of the deposited rubber coating, as indicated in Fig. 11, and tear the portion 19 away from the side wall of the paper box. This having been done, the torn away portion 19, as best shown in Fig. 14, may be pulled laterally and the bonding action between the flaps 16 and 17 and the membrane of rubber will be broken, with the result that as the membrane is pulled laterally, as shown in Fig. 14, the rubber membrane between the flaps will be gradually and cleanly torn away, thus releasing the flap members and permitting opening of the carton without in any way damaging the flap members or any other part of the carton.

Where the cardboard used to form the carton 15 is unusually heavy, it is best to place a strip of plaited paper 20 across the surface of the inner flaps. The plaits may run lengthwise, as shown in Fig. 15, or crosswise as shown at 21 in Fig. 17. The coating of latex may be applied to the single layer, such as shown in Fig. 16, or better yet, both sides of the plaited strip of paper coated with latex. This way, the sheet of rubber may be removed from between the flaps 16 and 17 by merely pulling on the plaited strip of paper.

As apparently many widely different embodiments of this invention may be made without departing from the spirit thereof, it will be understood that I do not intend to limit myself to the specific embodiments herein set forth, except as indicated in the appended claims.

What I claim is:

1. The method of forming a sheet of rubber and temporarily holding but subsequently dispensing same, which comprises coating one surface of a sheet of fibrous material such as paper with a layer of an aqueous dispersion of rubber, superimposing a layer of fibrous material upon the opposite side of the layer of rubber while still tacky, depositing the rubber from said aqueous dispersion of rubber as a thin membrane of rubber bonded to said two sheets of fibrous material, and then releasing the membrane of rubber from between said two sheets and separating the sheets by applying tension to said membrane greater than the bonding action between the membrane and the sheets of material.

2. The method of forming a sheet of rubber and temporarily holding but subsequently dispensing same, which comprises interposing a layer of an aqueous dispersion of rubber between two sheets of paper, depositing the rubber particles from said aqueous dispersion of rubber as a thin membrane of rubber, said thin membrane of rubber temporarily bonding said two sheets of paper together, then releasing the membrane of rubber from between said two sheets and separating the sheets by applying tension to said membrane greater than the bonding action between the membrane and the sheets of paper.

3. The method of forming, temporarily retaining and dispensing a thin sheet of rubber, which comprises interposing a layer of an aqueous dispersion of rubber between two sheets of fibrous material such as paper, depositing the rubber particles from said aqueous dispersion as a thin homogeneous membrane of rubber, said sheets of material being bonded together by said membrane of rubber, and then separating said two sheets of material and releasing the membrane of rubber by applying tension to said membrane greater than the bonding action between the membrane and the sheets of material.

4. The method of forming, temporarily retaining and dispensing a thin sheet of rubber, which comprises interposing a layer of an aqueous dispersion of rubber between two sheets of paper, depositing the rubber particles from said aqueous dispersion as a thin homogeneous membrane of rubber, said sheets of paper being bonded together by said membrane of rubber, then separating said two sheets of paper and releasing the membrane of rubber by tearing across the strips of paper to expose a portion of the membrane of rubber, and then applying lateral tension to said membrane greater than the bonding action between the membrane and the sheets of paper.

5. The method of temporarily sealing and releasing articles preparatory to dispensing, which comprises interposing an article or articles in an aqueous dispersion of rubber between two sheets of paper, depositing the particles of rubber from said aqueous dispersion to form a homogeneous membrane of rubber between said two sheets of paper and covering at least one side of said article or articles, and then releasing said article or articles by pulling away the membrane of rubber from between the two sheets of paper.

6. The method of temporarily sealing and releasing articles preparatory to dispensing, which comprises interposing an article or articles in an aqueous dispersion of rubber between two sheets of paper, depositing the particles of rubber from said aqueous dispersion to form a homogeneous membrane of rubber between said two sheets of paper and covering at least one side of said article or articles, and then releasing said article or articles by pulling away the membrane of rubber to expose said article or articles.

7. The method of temporarily sealing and retaining articles preparatory to dispensing, which comprises interposing two sheets of rubber, deposited from an aqueous dispersion of rubber, at least in part between two sheets of fibrous material, such as paper, interposing one or more spaced articles in between said sheets of rubber, said sheets of rubber being bonded to each other completely around each article or group of articles and being bonded to the two sheets of paper to form a hermetic seal around said article or articles.

8. The method of bonding a plurality of sheets of fibrous material together to form a temporary laminated sheet, which comprises interposing a coating of an aqueous dispersion of rubber between said sheets of material, depositing the rubber particles in said aqueous dispersion of rubber when the sheets of material are in contact with opposite sides thereof to form a membrane of rubber, and then cleanly releasing said sheets of material from each other by placing tension upon said membrane of rubber greater than the bonding action between said rubber and the sheets of material.

9. The method of temporarily securing closure members of a carton in closed position, sealing the carton and releasing the closure members, which comprises applying a coating of an aqueous dispersion of rubber to the upper surface of one or more closure flaps, folding one or more other flaps in position whereby said coating of rubber is retained between said two or more flaps, depositing the particles of rubber from the thin aqueous dispersion to form a thin membrane of rubber bonded to said flaps, said membrane of rubber forming a seal for the entire loading and dispensing end of the carton, and releasing said flaps by applying tension to said membrane of rubber and removing the same from between the flaps.

10. The method of temporarily securing closure members of a carton in closed position, which comprises applying a coating of an aqueous dispersion of rubber to the upper surface of one or more closure flaps, folding one or more other flaps in position whereby said coating of rubber is retained between said two or more flaps, depositing the particles of rubber from the aqueous dispersion to form a thin membrane of rubber bonded to said flaps, and releasing said flaps by applying tension to said membrane of rubber and removing the same from between the flaps.

11. The method of temporarily securing flap members in adjacent laminated relationship, which comprises interposing between parallel flaps a sheet of rubber deposited from an aqueous dispersion of rubber, the surface of said sheet of rubber, when initially contacting with the flaps, being sufficiently tacky to bond to the flaps and hold the same in parallel relationship, and then releasing the flaps by applying tension to said sheet of rubber and destroying the bond between said sheet of rubber and at least one of the flaps.

12. The method of temporarily securing flap members of a carton in adjacent laminated relationship, which comprises interposing between parallel flaps a sheet of rubber deposited from an aqueous dispersion of rubber, the surface of said sheet of rubber, when initially contacting with the flaps, being sufficiently tacky to bond to the flaps and hold the same in parallel relationship, a portion of said sheet extending past the flaps and over a portion of one of the side walls of said carton, first removing said extending part of said sheet of rubber from the side wall of the carton and then applying tension thereto to destroy the bond between said sheet of rubber and the flaps.

13. As a new article of manufacture, a dispensing device comprising two strips of paper temporarily bonded together by a sheet of rubber deposited from an aqueous dispersion of rubber, said strip of rubber being releasable by transversely tearing the two strips of paper at one end thereof and pulling the strip of rubber from between the two strips of paper.

14. As a new article of manufacture, a dispensing device comprising two strips of paper temporarily bonded together by a sheet of relatively tacky rubber deposited from an aqueous dispersion of rubber, said strip of rubber being releasable by transversely tearing the two strips of paper at one end thereof and pulling the strip of rubber from between the two strips of paper whereby overlapping surfaces of the strip of released rubber will stick to each other when wrapped around an article.

15. As a new article of manufacture, a laminated sheet comprising two strips of fibrous material such as paper, temporarily bonded together by a sheet of rubber deposited from an aqueous dispersion of rubber, said strip of rubber being releasable and said sheets of material being separated by pulling the strip of rubber and breaking the bond between said strip and said sheets of material.

16. A sealing and dispensing structure forming part of a package and the like, comprising two strips of paper temporarily bonded together by a sheet of rubber deposited from a wet freely flowing coating containing rubber, said sheet of rubber being bonded sufficiently to the two sheets of paper to maintain the package in closed sealing condition, said strip of rubber being releasable to break the seal and separate said strips of paper and open the package by breaking the bond between said sheet of rubber and said paper.

17. The method of forming, temporarily retaining and dispensing a thin sheet of rubber, which comprises separately coating one surface each of two sheets of fibrous material such as paper with a wet freely flowing coating containing rubber, superimposing the coated side of one sheet of fibrous material upon the coated side of the other sheet of fibrous material, depositing the rubber from said two layers of coating as a thin membrane of rubber bonded to said two sheets of fibrous material, and then releasing the membrane of rubber and separating the two sheets by applying transverse tension to said membrane greater than the bonding action between the membrane and the material.

18. The method of temporarily sealing and retaining articles preparatory to dispensing, which comprises separately coating one surface each of two sheets of fibrous material such as paper with a layer of rubber, each layer of rubber being bonded to its respective sheet of fibrous material, interposing one or more articles in between said sheets of rubber carried by said sheets of fibrous material, hermetically sealing said article or articles by bonding together the sheets of rubber around each article or group of articles, and then releasing said article or articles by placing tension upon said bonded together sheets of rubber greater than the bonding action between said rubber and the sheets of material.

19. As a new article of manufacture, a sealing and dispensing device comprising two sheets of fibrous material, such as paper, one or more articles in between said sheets of material, two sheets of rubber interposed between said sheets of material and covering at least a portion of each side of said article or articles, said sheets of rubber being bonded to each other completely around each article or group of articles to form in effect a single sheet of rubber and being bonded to the two sheets of material to form a hermetic seal around said article or articles, said article or articles being dispensed by tearing the two sheets of material and pulling the sheet of rubber away from the material.

LLOYD G. COPEMAN.